(12) United States Patent
Lin

(10) Patent No.: US 7,775,430 B2
(45) Date of Patent: Aug. 17, 2010

(54) SMART AND EASY SHOPPING USING PORTABLE RF TRANSCEIVER-ENABLED DEVICES AND FIXED IN-STORE RF TRANSCEIVERS

(75) Inventor: Jie Lin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 555 days.

(21) Appl. No.: 11/166,553

(22) Filed: Jun. 23, 2005

(65) Prior Publication Data

US 2006/0289635 A1    Dec. 28, 2006

(51) Int. Cl.
G06K 15/00   (2006.01)

(52) U.S. Cl. .................... 235/383; 235/375

(58) Field of Classification Search ........... 235/487, 235/383, 375, 381, 462.45, 462.46, 486; 705/22, 26, 28
See application file for complete search history.

(56) References Cited

U.S. PATENT DOCUMENTS

| | | | | | |
|---|---|---|---|---|---|
| 5,841,365 | A | * | 11/1998 | Rimkus | 340/5.61 |
| 6,011,487 | A | * | 1/2000 | Plocher | 340/825.49 |
| 6,091,956 | A | * | 7/2000 | Hollenberg | 455/456.5 |
| 6,954,735 | B1 | * | 10/2005 | Djupsobacka et al. | 705/27 |
| 7,309,009 | B2 | * | 12/2007 | Singer-Harter | 235/383 |
| 7,580,699 | B1 | * | 8/2009 | Shaw et al. | 455/410 |
| 2002/0069131 | A1 | * | 6/2002 | Miyata et al. | 705/26 |
| 2002/0178013 | A1 | * | 11/2002 | Hoffman et al. | 705/1 |
| 2003/0011477 | A1 | * | 1/2003 | Clapper | 340/573.1 |
| 2003/0160809 | A1 | * | 8/2003 | Marion | 345/700 |
| 2004/0093274 | A1 | * | 5/2004 | Vanska et al. | 705/26 |
| 2004/0099736 | A1 | * | 5/2004 | Neumark | 235/385 |
| 2004/0103034 | A1 | * | 5/2004 | Reade et al. | 705/16 |
| 2004/0111454 | A1 | * | 6/2004 | Sorensen | 708/200 |
| 2004/0186768 | A1 | * | 9/2004 | Wakim et al. | 705/14 |
| 2004/0236547 | A1 | * | 11/2004 | Rappaport et al. | 703/2 |
| 2005/0033665 | A1 | * | 2/2005 | Kumhyr | 705/28 |
| 2005/0067492 | A1 | * | 3/2005 | Amitay et al. | 235/385 |
| 2005/0071234 | A1 | * | 3/2005 | Schon | 705/22 |
| 2005/0149226 | A1 | * | 7/2005 | Stevens et al. | 700/214 |
| 2005/0201826 | A1 | * | 9/2005 | Zhang et al. | 404/2 |
| 2005/0218218 | A1 | * | 10/2005 | Koster | 235/383 |
| 2005/0230472 | A1 | * | 10/2005 | Chang | 235/383 |
| 2005/0246094 | A1 | * | 11/2005 | Moscatiello | 701/207 |
| 2005/0256781 | A1 | * | 11/2005 | Sands et al. | 705/26 |
| 2005/0256782 | A1 | * | 11/2005 | Sands et al. | 705/26 |
| 2006/0036517 | A1 | * | 2/2006 | Walter | 705/29 |
| 2006/0087474 | A1 | * | 4/2006 | Do et al. | 342/386 |
| 2006/0092072 | A1 | * | 5/2006 | Steiner | 342/46 |
| 2006/0293968 | A1 | * | 12/2006 | Brice et al. | 705/26 |

* cited by examiner

*Primary Examiner*—Edwyn Labaze
(74) *Attorney, Agent, or Firm*—Luis M. Ortiz; Kermit D. Lopez; Kevin L. Soules

(57) ABSTRACT

Portable handheld transceiver-enabled devices (e.g., PDA or cell phone) and an enterprise system that stores and maintains a digital map and database to enable customers using the portable devices within a store to access information about the location of products in the store and their availability. Several fixed transceivers are installed throughout a store and portable transceiver-enabled handheld devices used by customers within the store communicate within the store. Portable handheld transceiver-enabled devices communicate with fixed transceivers and download the locations and available quantities of desired product. Customers can use portable devices to obtain the shortest walking route within a store to obtain a desired product based on fixed transceiver proximity to portable devices. Customer can also search the store database for the exact location of items within a store using the portable devices.

19 Claims, 5 Drawing Sheets

SMART AND EASY SHOPPING USING PORTABLE RF TRANSCEIVER-ENABLED DEVICES AND FIXED IN-STORE RF TRANSCEIVERS

TECHNICAL FIELD

The present disclosure in generally related to methods and systems for electronically enabling convenient shopping at stores. More particularly, the present disclosure is related to a system including store customer use of portable handheld transceiver-enabled devices in communication with fixed store-based transceivers with access to a database. The present disclosure is also related to storage and maintenance of a digital maps and product information within a database to enable customer access to the location and/or availability of products to the customer while customers use the devices in the shopping venue.

BACKGROUND

When a customer walks into a store, he/she has to find the specific products that he/she wants to buy. This usually is done by either asking a store associate or looking at the store signs. Many times, this search is very time-consuming and inefficient. Sometimes the customer may even abandon the search.

What is needed are more efficient ways for customers to locate and determine the availability of products within a store. Methods and system are disclosed herein that addresses the aforementioned problems and makes customer shopping experiences more efficient and almost effortless.

SUMMARY OF THE EMBODIMENTS

In accordance with features the present embodiment, customers can be equipped with a RF transceiver-enabled device such as a PDA or cell phone. Transceivers can include RFID, Bluetooth and other short range wireless communications technology and standards.

In accordance another feature of the embodiment, a store can maintain within a database associated with enterprise computer systems a digital map showing the location and/or availability of each product stocked by the store. The computer system maintains communication with several fixed transceivers (also capable of short range RF transmission with standards such as Bluetooth) that are installed throughout the store.

In accordance another feature of the embodiment, the customer's handheld device communicates with the fixed transceiver when a customer walks near one of the store's fixed transceivers and downloads at least one of a store map, product location on the store map, and availability of a desired product.

In accordance with another feature of the embodiment, the system can determine the shortest walking route for a customer to obtain a product requested by the customer, and provide an illustration of the shortest walking route on the handheld device being used by the customer.

In accordance with another feature of the embodiment, a customer can search for the location of a specific item through his handheld device by submitting a product request through a handheld device to a store computer system using short range radio frequency communications.

DETAILED DESCRIPTION OF EMBODIMENTS

Figure 1:
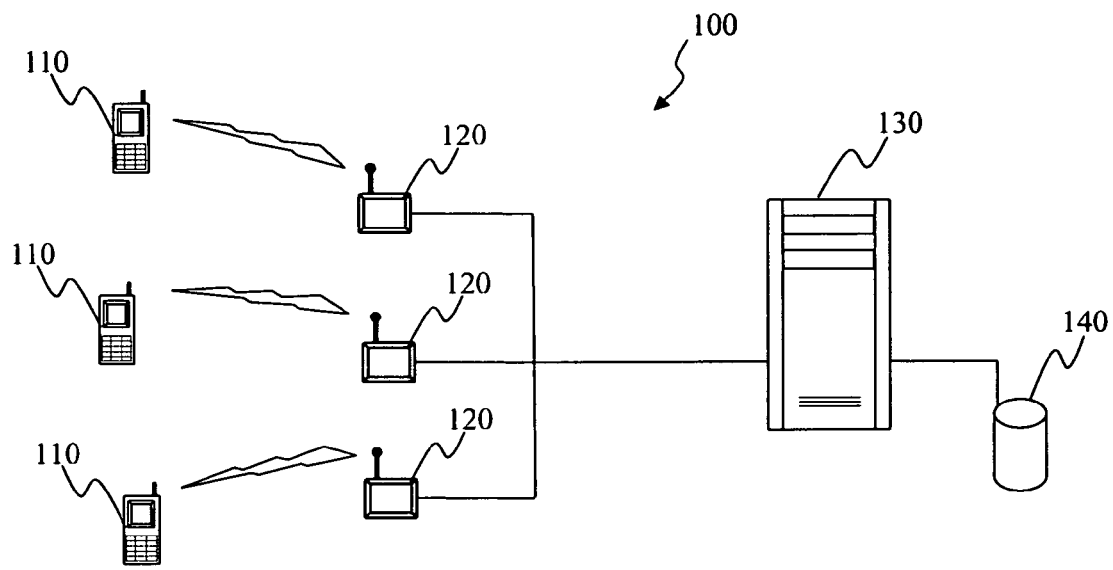
FIG. 1 illustrates system architecture in accordance with features of the embodiment.

Referring to FIG. 1, a system 100 in accordance with the embodiment is shown that includes the use of portable handheld devices 110 with an embedded short range radio frequency transceiver, fixed in-store transceivers 120, a store computer system 130 and access to a database 140 of store product information. The handheld device transceivers can be provided in the form of an RFID readers and tag such can be found in cell phones and PDAs. The short range transceivers can also be provided in the form of a Bluetooth and 802.11x transceiver module.

Figure 2:
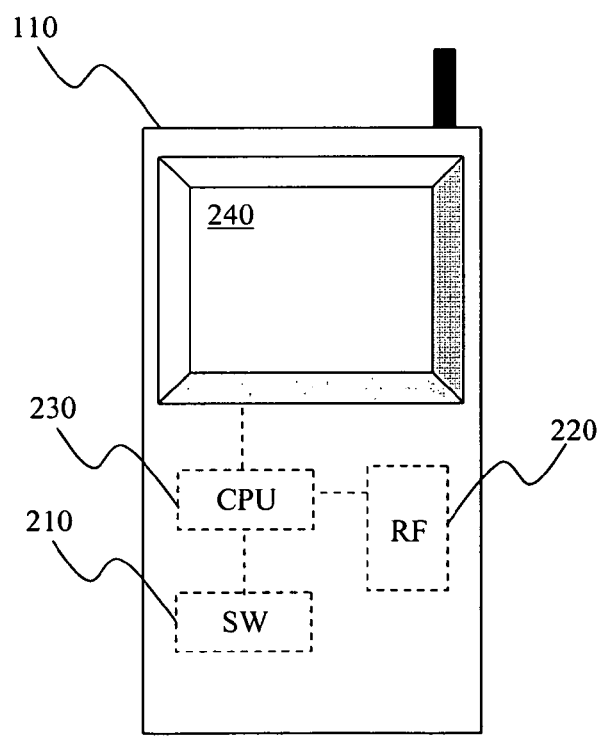
FIG. 2 illustrates operations modules in a handheld device in accordance with features of the embodiment.

Referring to FIG. 2, components of a handheld device 110 are illustrated. A shopping software module 210 in the handheld device 110 can be provided to enable and control communication between the handheld device 110 and the embedded RF transceiver 220 for shopping-related functions. A CPU 230 manages software, handheld and transceiver functions. The hand held device 110 also includes a display screen 240 for displaying store floor plan maps and product location coordinates. It should be appreciated that product data, including price, specials, promotions, coupons, can also be displayed on the display 240.

Figure 3:
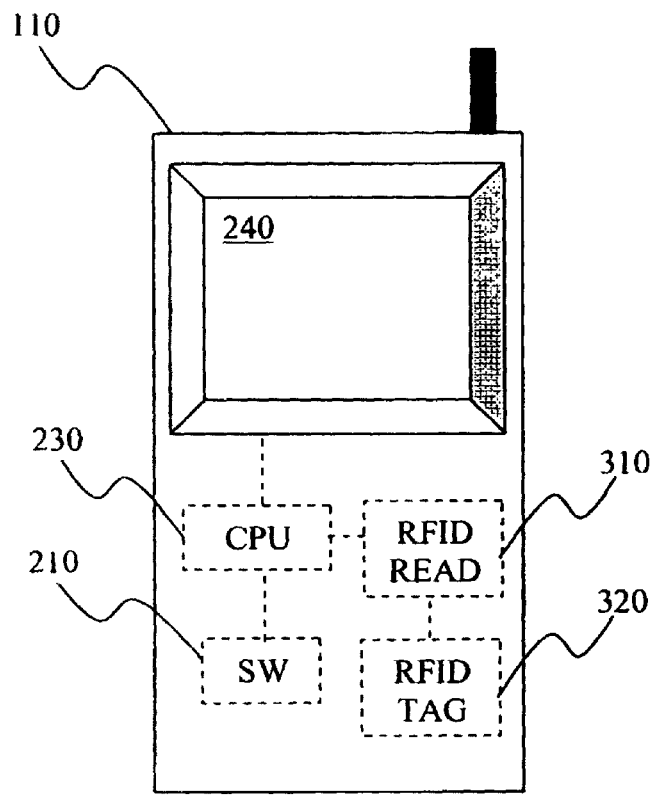
FIG. 3 illustrates operations modules of in a handheld device in accordance with features of the embodiment.

Referring to FIG. 3, a handheld device 110 adapted for using RFID specific communications is shown. The handheld device 110 includes a shopping software module 210 and display screen 240 as with the handheld device in FIG. 2. The RFID enabled hand held device 110 in FIG. 3, however, includes an RFID reader 310 and an RFID tag 320. The RFID tag is adapted to communicate with fixed in store RFID readers 120.

Figure 4:
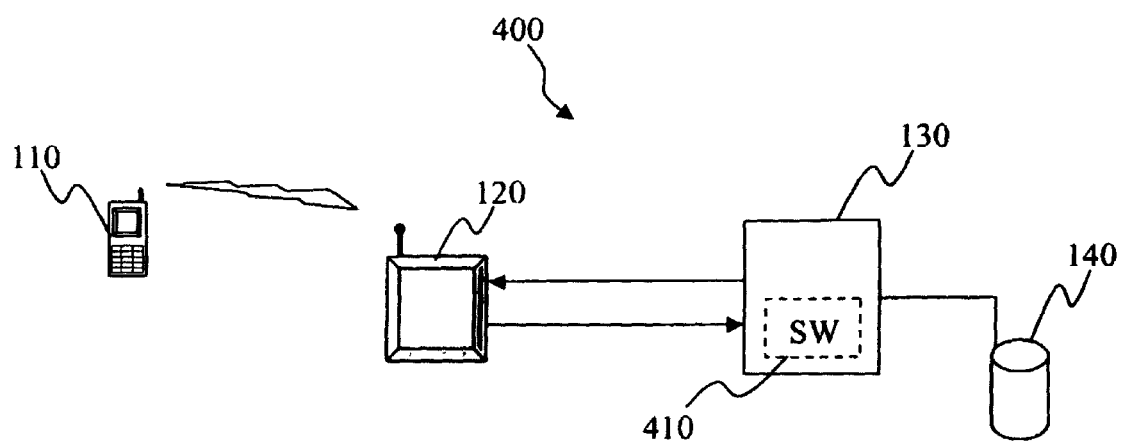
FIG. 4 illustrates operations modules of a store's computer system in accordance with features of the embodiment.

Referring to FIG. 4, components of a store's data communication system 400 are illustrated. A product management software module 410 is installed in the store's computer system 130 to manage communications through the fixed in-store transceivers 120 and their communication with handheld devices 110. The computer system 130 can perform shortest route computation for a customer based on a product location request and the customer's communication with and/or proximity to a particular fixed in-store transceiver 120. Either the computer system 130 or a handheld 110 based on information from the computer 130, can generate a digital map of the store's floor plan and depict on the map where the customer is located and where the product that was requested is located. A database 140 or memory accessible by the computer provides the computer with the location and quantity of each product in the store as well as the physical location of each fixed RF transceiver located in the store.

Figure 5:
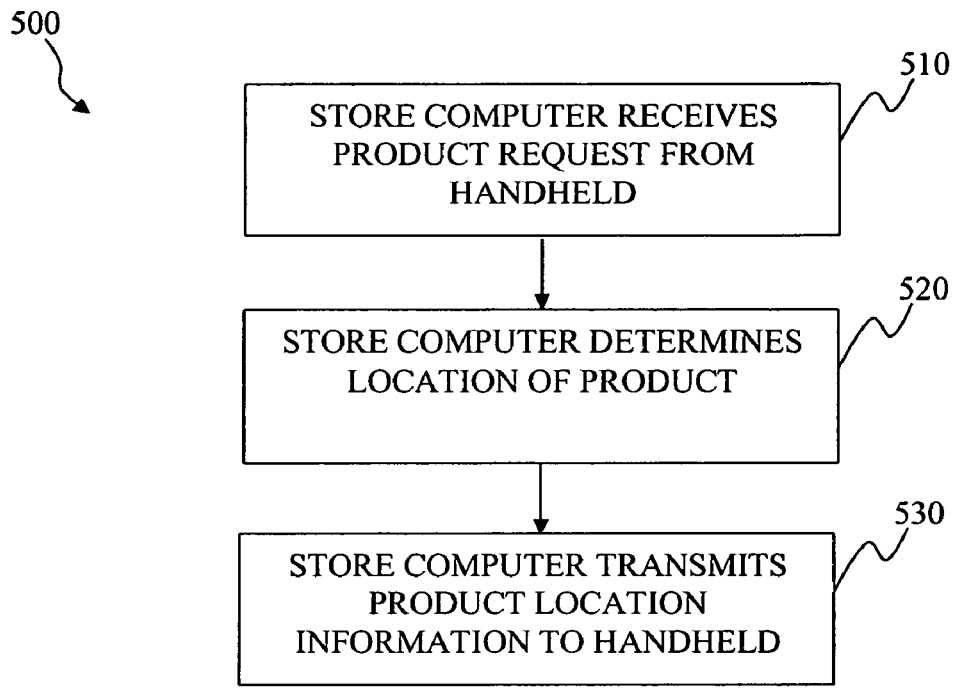
FIG. 5 illustrates a flow diagram in accordance with methods steps in accordance with features of the embodiment.

Referring to FIG. 5, a flow diagram 500 is illustrated. As shown in block 510, the store's computer system receives a product location request from a hand held device. As shown if block 520, the store's computer system determines the product's location within the store. As shown in block 530, the store's computer system transmits product location information to the requesting hand held device. Product location information sent to the handheld device in block 530 can be depicted on a map transmitted to the handheld device and rendered on a display screen 240 associated with the hand held device.

Figure 6:
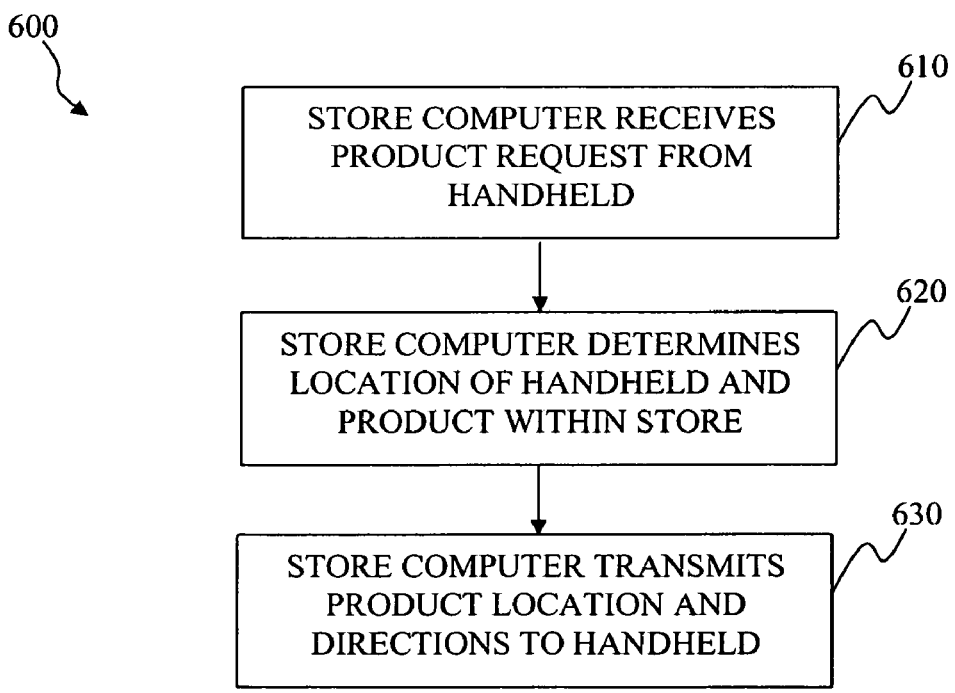
FIG. 6 illustrates a flow diagram in accordance with methods steps in accordance with features of the embodiment.

Referring to FIG. 6, a flow diagram 600 is illustrated. As shown in block 610, the store's computer system receives a product information request from a hand held device. As shown if block 620, the store's computer system determines the location of the handheld device and the product's location within the store. As shown in block 630, the store's computer system transmits product location information to the requesting hand held device and directions to the product based on the location of the handheld device within the store. Product location information sent to the handheld device in block 630 can be depicted on a map transmitted to the handheld device and rendered on a display screen associated with the hand held device.

Figure 7:
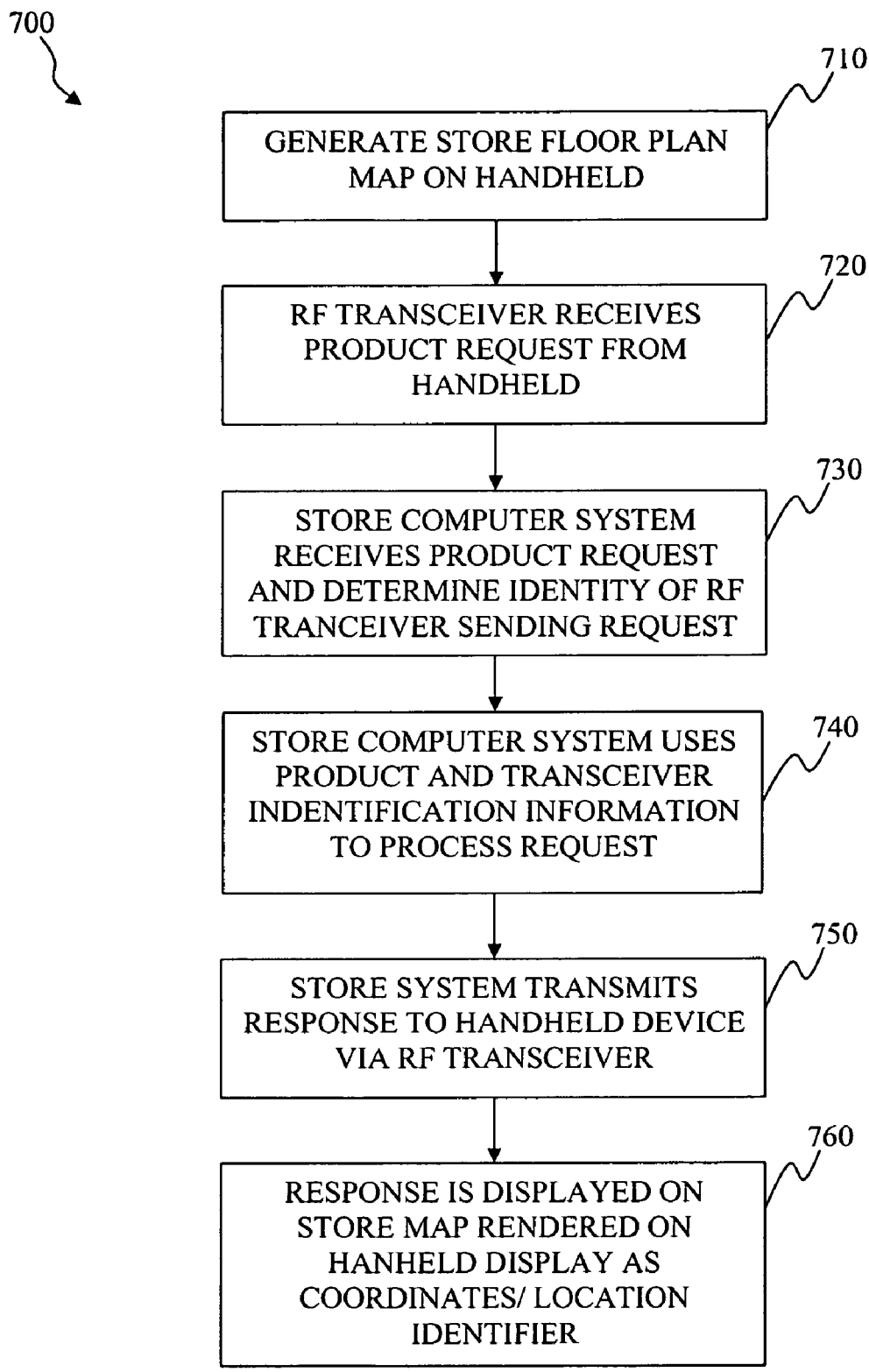
FIG. 7 illustrates a flow diagram in accordance with methods steps in accordance with features of the embodiment.

Referring to FIG. 7, a flow diagram 700 of executing a method in accordance with the embodiment is illustrated. The system can perform shortest route computation using a digital map of the stores floor plan, location and quantity of all products in the store, as well as the physical location of each fixed in-store transceiver and communicating handheld devices. As shown in block 710, a template digital map can be generated on a handheld device, which can be used for depicting the location and quantity of each product in the store's floor plan. As shown in block 720, an RF transceiver receives a request from a hand held device for a specific product. As shown in block 730, the computer system receives the product request and the identity of the fixed RF transceiver receiving the request. As shown in block 740, the system uses the product and transceiver identity to process the request. As shown in block 750, the store's system transmits a response to the request to the hand held device via the fixed transceiver. As shown in block 760, the response is displayed as a coordinate or identifier on the map of the store's floor plan rendered on a display associated with the hand held device.

It can be appreciated that the product location within the store can be registered within the system for each product contained in the store. It should also be appreciated that RFID tags can be attached to each item in the store, or shelf location associated with each product in the store. Therefore, each item can be detected by fixed RFID transceivers within the store.

Associating RFID tags with each product is ideal and more adaptive, but can be more costly to implement. However, since attaching an RFID tag to each item in the store can also have other usages such as providing live stocking information for the supply chain application and preventing theft, it is suspected that in the future stores may in fact attach an RFID label to each item in the store. Store customers can always search for product's location and availability and obtain the best route to complete his/her shopping regardless of how product location information is determined and transmitted to handhelds within the shopping venue.

Figure 8:
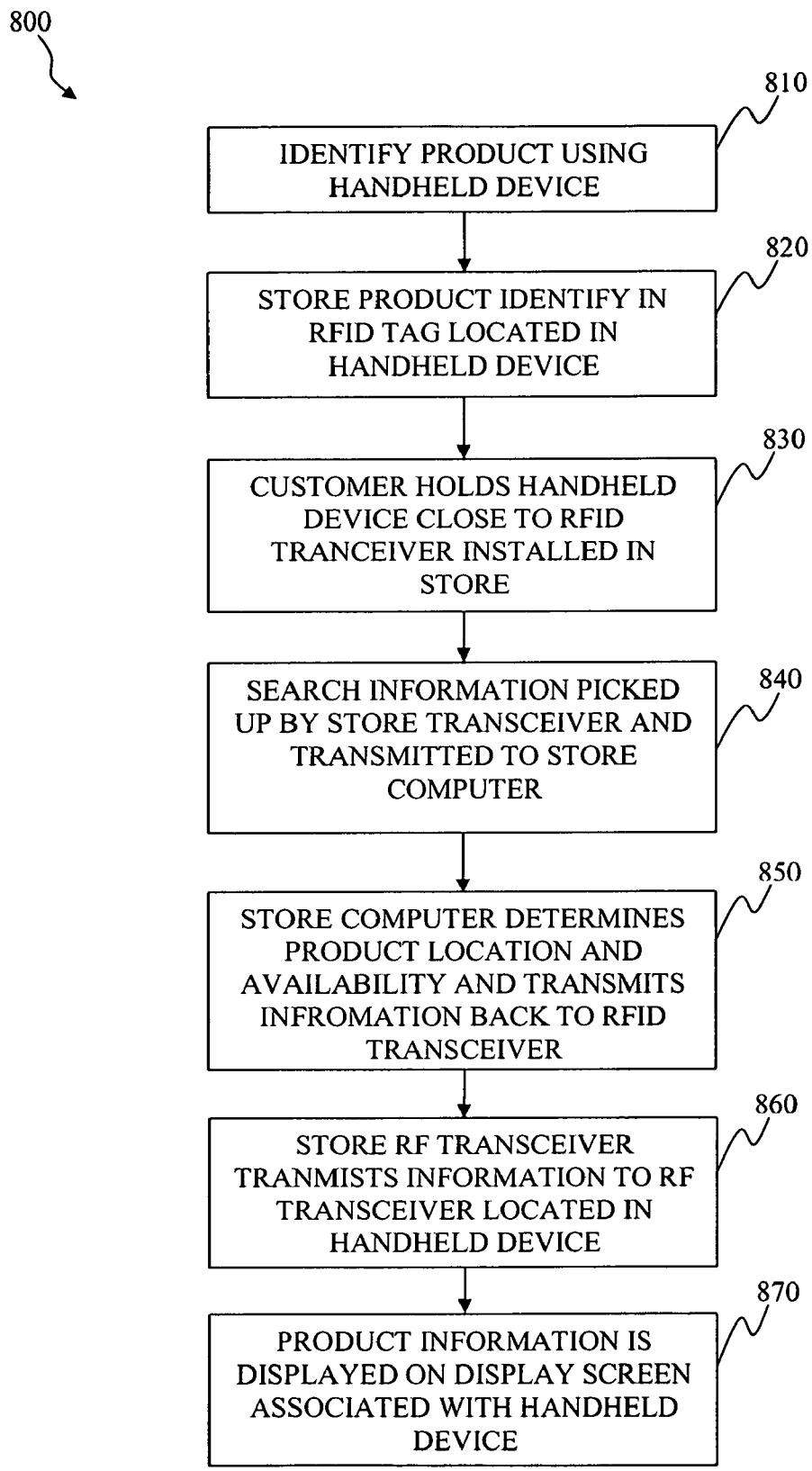
FIG. 8 illustrates a flow diagram in accordance with methods steps in accordance with features of the embodiment.

Referring to FIG. 8, a flow diagram 800 describing the use of RFID readers installed through a store is illustrated. After a customer walks into a store, he/she can start to look for a particular product by identifying the product name or SKU number using a personally- or store-owned handheld device as shown in block 810 to initiate a search. As shown in block 820, the information is temporarily stored on an RFID tag in the hand held device. As shown in block 830, the customer can hold the handheld device close enough to a RFID transceiver installed in the store. The search information will then be picked up by a store RFID transceiver and sent to the store computer as shown in block 840. The store computer determines product location and availability and sends the information back to the store RFID transceiver as show in block 850. The store RFID transceiver then relays the information to an RFID transceiver located in the customer's handheld device as shown in block 860. Then, as shown in block 870, the product location information is displayed on a display screen associated with the handheld device.

It can be appreciated following this foregoing disclosure that the customers can either perform several searches individually or perform several searches simultaneously. It can also be appreciated now that, using multiple fixed RF transceivers within a store, approximate locations for the product and requesting hand held devices can be determined using triangulation by the system based on input from more than one fixed RF transceiver. Thereafter, a real-time digital map can be created on the handheld using location coordinates provided by the store's computer system. Therefore, after the customer completes a product search, the customer can request for a shortest route to all the desired items from his/her current location. The customer's current location can also be given by the location of the store RFID reader that the customer is interacting with. This request will then be sent to the store computer in the manner described above. The store computer can also compute the shortest route. The computed route will include the sequence of each desired item. This result can then be communicated back to the customer in the same manner described above.

Using the present embodiment, an RFID tag is attached to each product so that the physical location of each product is known by a store's computer system. Assuming a store has enough RFID readers providing RF coverage, a customer's location can be identified each time he/she retrieves a desired item from the shelf. Thus the shortest route for the remaining desired items can be dynamically updated on the customer's handheld device using the store's computer system. Such a feature is useful in both locating the customer in the store and helping customer to get a new route if customer deviates from the previously computed best route.

It should now be appreciated how the present embodiment can improve the shopper's efficiency and reduce the number of store associates needed. It can also reduce the possibility that a customer abandons the search for some desired items and therefore increase the store revenue. Moreover, since the RFID technology can be also used for live stock information, theft prevention and express checkout, there could be a synergy of attracting more customers to the store. This invention may also increase the sales of the RFID-enabled cell phones.

The invention claimed is:

1. An in-store shopping system, comprising:
a store computer system configured to maintain digital map data, store product information in a database and permit customers using portable RF transceiver-enabled devices operating within a store to access said digital map data and information regarding a location of a product in the store and an availability of the product; and
more than one fixed RF transceiver and a plurality of RFID tags installed throughout the store on a plurality of products, and installed within said portable RF transceiver-enabled devices, wherein the plurality of RFID tags communicate within the store with portable RF transceiver-enabled handheld devices utilized by customers and the more than one fixed RF transceiver can communicate within the store with portable RF transceiver-enabled handheld devices used by customers.

2. The system of claim 1 further comprising at least one portable handheld RF transceiver-enabled device in communication with at least one of the more than one fixed RF transceivers and the plurality of RFID tags associated with the store computer system.

3. The system of claim 1, wherein said store computer system includes a module that permits is to enable customers using the portable RF transceiver-enabled devices within a store to access information about the location of products in the store and their availability.

4. The system of claim 1 further comprising a module configured to permit portable handheld RF transceiver-enabled devices to communicate with the fixed RF transceivers and RFID tags on products or shelves and download the locations and available quantities of a desired product from said store computer system.

5. The system of claim 1 further comprising a module configured to permit a user of the at least one portable handheld RF transceiver-enabled devices to obtain a shortest walking route within the store to obtain a desired product based on a proximity of a plurality of said RFID tags to the portable handheld RF transceiver-enabled devices.

6. The system of claim 1 further comprising a module configured to permit a user of a portable handheld RF transceiver-enabled device to search the store computer system for the exact location of items within the store.

7. The system of claim 1, wherein the portable handheld RF transceiver-enabled device is configured to permit customers using the portable handheld RF transceiver-enabled devices within a store to access information about the location of products in the store and their availability.

8. The system of claim 1, wherein the portable handheld transceiver-enabled device is configured to permit portable handheld RF transceiver-enabled deices to communicate with the fixed RF transceivers and RFID tags on products or shelves and download the locations and available quantities of desired product from said store computer system.

9. The system of claim 1, wherein the portable handheld RF transceiver-enabled device is configured to permit a user of the at least one portable handheld RF transceiver-enabled devices to obtain a shortest walking route within the store to obtain a desired product based on a proximity of a plurality of said RFID tags proximity to the portable handheld RF transceiver-enabled devices.

10. The system of claim 1, wherein the portable handheld RF transceiver-enabled device is configured to permit a user of a portable handheld RF transceiver-enabled device to search the store computer system for the exact location of items within the store.

11. A method of determining a product status by a store computer system including short range RF communications hardware, comprising the steps of:
a store computer system wirelessly receiving from a handheld device, a request for product information including a location of products within the store;
dynamically determining via the store computer system, the location of the products within the store based on an RFID tag;
dynamically determining via the store computer system, the location of the handheld device within the store based on an RFID tag associated with the handheld device; and
the store computer system wirelessly transmitting product information including the location of a product to the handheld device.

12. The method of claim 11 further comprising the steps of:
graphically depicting the product information sent to the handheld device on a map of a floor plan of the store; and
transmitting the product information to the handheld device from the store computer system for rendering on a display screen associated with the handheld device.

13. The method of claim 11 wherein product location information sent to the handheld device includes directions regarding the shortest route through the store to a location of the product based on the location of the product and a location of the handheld device.

14. The method of claim 11 wherein the product location information sent to the handheld device is depicted on a map of a floor plan of the store, wherein the floor plan is further rendered on a display screen associated with the handheld device.

15. The method of claim 11 wherein product information sent to the handheld device includes directions regarding a shortest route through the store to the in-store location of the product.

16. A method of determining product status and in-store location, comprising the steps of:
wirelessly transmitting from a handheld device to a store computer system via short range RF communications, a request for product information associated with a product, wherein the product information includes an in-store location of the product;
wirelessly receiving at the store computer system, the request for product information including the in-store location of the product with respect to the handheld device;
determining, via the store computer system, the in-store location of the product based on an RFID tag associated with the product;
determining, via the store computer system, a location of a user of the handheld device within the store based on an RFID tag associated with the handheld device; and
wirelessly transmitting from the store computer system to the handheld device, the product information, wherein the product information includes the in-store location of the product.

17. The method of claim 16 further comprising the steps of:
graphically depicting on a floor plan of the store, the in-store location information; and
displaying the floor plan with the in-store location information on a display screen associated with the handheld device.

18. The method of claim 16 further comprising the steps of:
determining via the store computer system, the location of the handheld device within the store before determining the in-store location of the product; and
transmitting directions regarding a shortest route through the store to the in-store location of the product, based on the location of the handheld device within the store.

19. The method of claim 18, wherein the product location information sent to the handheld device is depicted on a map of a floor plan of the store, wherein the map is also transmitted to the handheld device from the store computer system and rendered on a display screen associated with the handheld device.

* * * * *